Feb. 21, 1956 K. FRISCHMANN 2,735,337
BINOCULAR MICROSCOPE
Filed Aug. 7, 1953 2 Sheets-Sheet 2
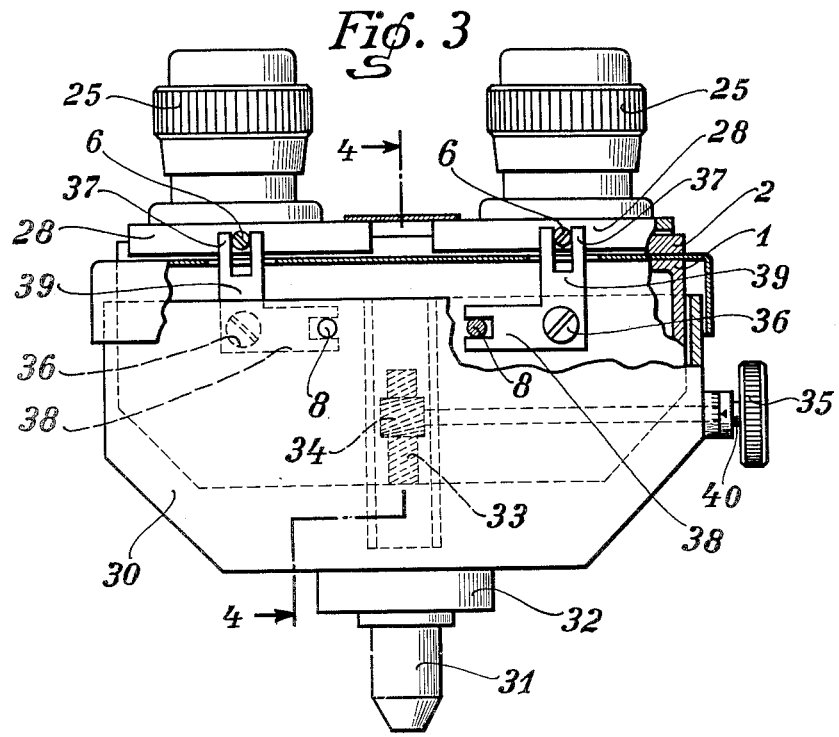
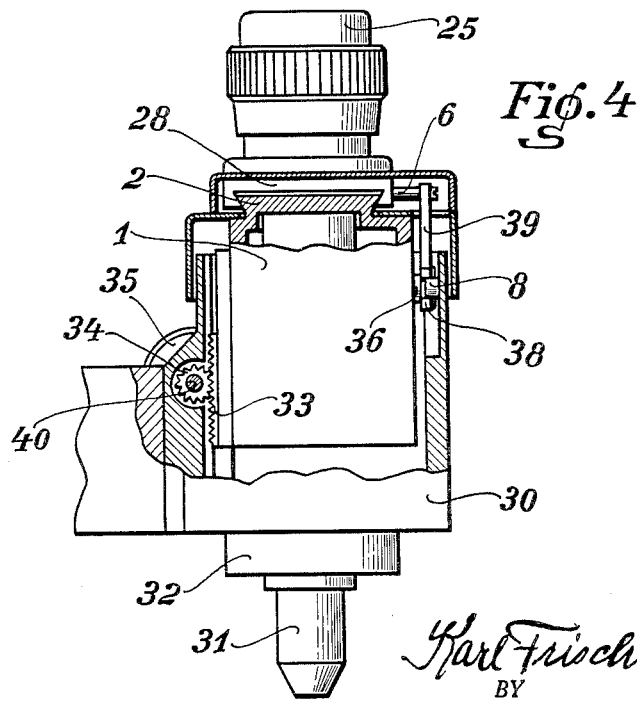
INVENTOR.
Karl Frischmann
BY
Ivan E. A. Königsberg

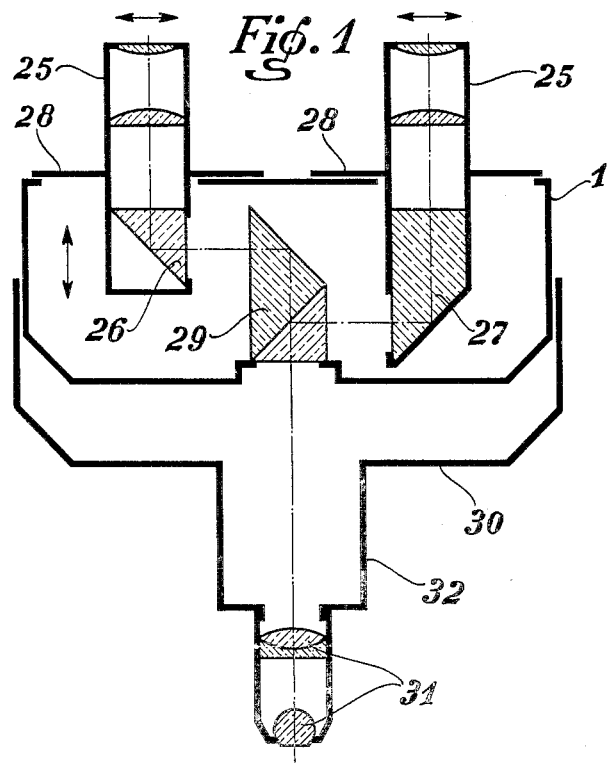
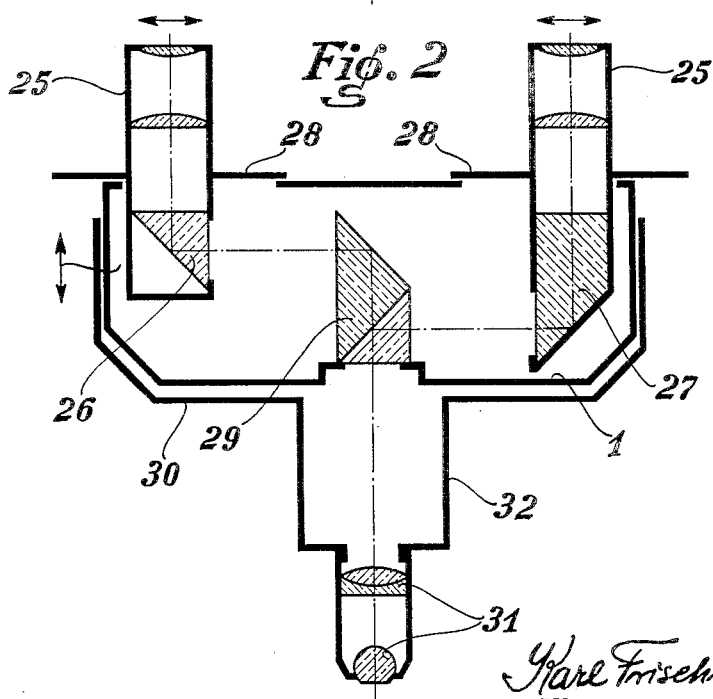

United States Patent Office 2,735,337
Patented Feb. 21, 1956

2,735,337

BINOCULAR MICROSCOPE

Karl Frischmann, Wetzlar-Garbenheim, Germany, assignor to Ernst Leitz, G. m. b. H., a corporation of Germany Application August 7, 1953, Serial No. 373,019

Claims priority, application Germany August 11, 1952

1 Claim. (Cl. 88—39)

This invention relates to the mechanism used in binocular microscopes for adjusting the oculars laterally to suit the pupillary distances of different users and at the same time adjusting the vertical positions of the oculars proportionally to the lateral adjustment so that the focal length between oculars and objective remains constant.

The object of the invention is to provide a novel, very simple and practical adjustment mechanism including an easily reached manually rotated knob for actuating the mechanism.

Accordingly the invention is embodied in an adjustment mechanism for binocular microscopes as hereinafter described and as illustrated in the accompanying drawings in which—

Figs. 1 and 2 are diagrammatic views of a binocular microscope adjustment mechanism embodying the invention with the oculars adjusted in two different positions.

Fig. 3 is a view in elevation of a binocular microscope provided with the novel adjustment mechanism.

Fig. 4 is a sectional view taken substantially on the bent line 4—4 of Fig. 3.

The ocular tubes 25, 25 are mounted on base plates 28 and contain the ocular lens systems and prisms 26, 27. The plates 28 are laterally slidably mounted in a prism housing 1, as indicated at 2, Fig. 4. The housing 1 slides vertically within a casing 30, hereinafter called the objective casing, which includes the objective tube 32 with the objective 31. The usual ray dividing prism is shown at 29. The lateral spacing between the ocular tubes occurs automatically by the raising or lowering of the prism housing within the objective casing 30. The latter is in known manner mounted on a microscope stand, not shown.

The prism housing 1 carries a toothed rack 33 which meshes with a gear 34 on a shaft 40 supported in the casing 30. Outside the latter the shaft carries a hand knob 35 for rotating the shaft and the gear to raise or lower the prism housing 1.

The base plate 28 of each ocular tube carries a bolt 6 and the bolts 6 are slidably engaged by the one arm 37 of two armed levers 39 which are pivoted at 36 on the housing 1. The levers 39 have each a second arm 38 which slidably engages a bolt 8, one for each ocular tube, secured in the fixed objective casing 30.

When the knob 35 is rotated, the prism housing 1 is either raised or lowered by the gear 34 and rack 33. Hence the levers 39 are tilted on their pivots 36 either to the left or to the right, as the case may be, and consequently the upper lever arms 37 move the ocular tubes closer together or farther apart. The two extreme adjusted positions of the ocular tubes are shown in Figs. 1 and 2 which also show that the total length of the optical distance between objective and ocular lens systems remains unchanged.

When the prism housing is raised or lowered the entire upper lens system above the objective moves as a unit with respect to the objective.

I claim:

In a binocular microscope, an objective casing having an open top and a bottom forming a centrally located objective tube, an objective in said tube, a prism housing supported to move vertically within said objective casing, a light ray dividing prism secured in the bottom of said prism housing in axial alinement with the said objective, a centrally located toothed rack secured on one side of said prism housing, a shaft rotatably supported in said casing and extending to the outside thereof, a gear on the inner end of said shaft engaging the said toothed rack, a hand knob on the outer end of said shaft for rotating the latter and the said gear whereby to move the said prism housing vertically up or down within the casing, an ocular tube in said prism housing on each side of said rays dividing prism, each of said ocular tubes having ocular lenses at the top and a light rays receiving and reflecting prism at the bottom for receiving the light rays from said ray dividing prism and reflecting the rays upward to said ocular lenses, a base plate secured to each of said ocular tubes and engaging said prism housing to slide laterally thereupon, a bolt on each ocular tube base plate, another bolt for each base plate secured in said objective casing and a lever for each base plate fixedly pivoted on said prism housing to move therewith, said levers slidably engaging the said pairs of bolts for moving the base plates and ocular tubes laterally upon said prism housing to vary the interpupillary distance between the ocular tubes in proportional response to the simultaneous vertical movement of the light ray dividing prism and the oculars when said prism housing is moved vertically within said objective casing by operation of the aforesaid toothed rack and gear, said bolts and said levers being enclosed within the said housing and the said casing on the side opposite to the location of the said rack and gear whereby to secure an evenly balanced vertical movement of the prism housing within the objective casing.

References Cited in the file of this patent

UNITED STATES PATENTS 914,838   Von Hofe _____ Mar. 9, 1909

FOREIGN PATENTS 825,462   Germany _____ Dec. 20, 1951